United States Patent Office 3,316,300
Patented Apr. 25, 1967

3,316,300
PROCESS FOR THE PRODUCTION OF ALIPHATIC DIAMINES
Günter Nawrath, Dormagen, Germany, assignor to Farbenfabriken Bayer Aktiengesellschaft, Leverkusen, Germany, a German corporation
No Drawing. Filed Oct. 1, 1963, Ser. No. 312,861
Claims priority, application Germany, Oct. 18, 1962, F 38,073
7 Claims. (Cl. 260—583)

The present invention relates to an original chemical chemical process for the production of aliphatic diamines which comprise a relatively long alkylene bridge.

No processes are as yet known in which the Schiff's bases of aliphatic diaminoketones are transformed, in one step and with a good yield, into the corresponding free diamines.

It has now been found that aliphatic diamines of the formula

in which $n$ represents an integer from 3 to 7, are obtained if the Schiff's bases of diaminoketones of the formula

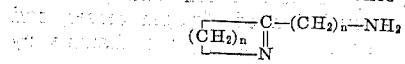

in which $n$ represents an integer from 3 to 7, are reacted with hydrazine or semicarbazide in the presence of strong bases at temperatures from 100 to 300° C.

Nitrogen is evolved in the reaction according to the invention.

It is extremely surprising that, in the reaction according to the invention, the ring of the cyclic Schiff's base is split, with simultaneous hydrogenation of the ketimide group. It is particularly surprising that both the splitting and the hydrogenation take place without any side reactions, so that it is possible in a single step to convert the Schiff's base of the diaminoketone into the free aliphatic diamine with yields up to 100%.

The starting substances for the process according to the invention are clearly reproduced by the formulae. The substances are known. Since the starting substances are produced simply from material which is readily available industrially, they are themselves also readily available.

The starting substances according to the invention are produced by the known processes, preferably by heating lactams, amino carboxylic acids or polyamides in the presence of alkaline earth metal oxides.

The following are starting substances which are especially suitable for the process according to the invention: The Schiff's bases of 1,7-heptan-4-one, of 1,1-diaminoundecan-6-one and of 1,13-tridecan-7-one.

It is not necessary to use solvents in the process according to the invention.

The hydrazine used as hydrogenating reagent can be used in pure form, but also in the conventional 80% or 24% aqueous solution, the same applies as regards the semi-carbazide.

Any inorganic base is to be considered as strong base for the process according to the invention, but organometallic compounds can also be used. The following are to be specifically mentioned: alkali metal hydroxides, such as potassium hydroxide and sodium hydroxide, and alkaline earth metal hydroxides such as calcium hydroxide and barium hydroxide. The oxides of the alkaline earth metals are also suitable. More especially the alcoholates of the alkali metals and of the alkaline earth metals are to be considered as organometallic compounds; thus sodium ethoxide, sodium methoxide, potassium butoxide and calcium ethoxide are, for example, suitable.

The reaction according to the invention can be carried out over a wide temperature range; it has proved expedient to work at temperatures from 100 to 350° C., especially at temperatures from 150 to 250° C.

It has proved expedient to use 1 to 2 mols of hydrazine, preferably 1 to 1.3 mols of hydrazine, to 1 mol of the Schiff's base in the reaction according to the invention.

The strong bases are employed in quantities from 2 to 50%, calculated on the Schiff's base, in the process of the invention, but it is possible to work with smaller or larger quantities.

When carrying out the process of the invention, it is possible for the three reactants to be introduced into a reaction vessel and first to boil the reaction mixture under reflux for some time, e.g. a few hours. It is expedient to continue heating until practically no more nitrogen is evolved. In this reaction, it is important for the catalyst to be distributed as satisfactorily as possible and this can be achieved in the usual way, e.g. by stirring.

In principle, it is also possible to carry out the reaction in a closed vessel under superatmospheric pressure; the temperature can then be raised beyond the boiling point.

After evolution of nitrogen has ceased, the free diamine which has formed is distilled off. For this purpose, it is expedient to work in vacuo, at approximately 10 to 500 mm.

The process according to the invention has a number of advantages. It uses simple starting materials, employs only auxiliary substances which are easily available, is conducted under simple reaction conditions and leads to high yields. The reducing action of the hydrazine is restricted exclusively to the ketimide group and the diamines obtained are of high purity.

Some of the diamines obtained according to the invention are novel and are valuable intermediates for the production of different types of end products, such as rubber auxiliaries, textile auxiliaries and insecticides. They are especially suitable as starting materials for the manufacture of polyamides and polyureas. For this purpose, the diamines are polycondensed with dicarboxylic acids or with urea.

It is already known that polyureas which are produced in this way are particularly suitable for the production of fibres. The diamines can also be employed in known manner to produce polyurethanes of high molecular weight. These substances have also recently acquired considerable interest for the manufacture of fibres, films and foils.

*Example 1*

370 g. (2 mols) of the Schiff's base of 1,11-diaminoundecan-6-one [from caprolactam, see Angewandte Chemie, No. 24, Page 1002 (1960)] are mixed with 2.5–3.0 mols of hydrazine, as the usual 80% aqueous solution, and heated on a boiling water bath under water jet vacuum until the weight of the contents of the flask is 450 g. The water is distilled off.

200 g. of potassium hydroxide as small tablets and 100 g. of the aforementioned mixture are introduced into a three-necked flask (2 litres), which is provided with a stirrer device, a reflux condenser with a fitted dropping funnel and with a gas discharge tube. On heating over an oil bath, which is slowly heated up to 200° C., the mixture in the reaction flask starts to generate nitrogen at 170° C. As soon as the evolution of nitrogen subsides somewhat, the other 250 g. of the aforementioned mixture are added in small portions. After 8 to 10 hours, the evolution of nitrogen ceases. A check is made by means of sodium nitroprusside for any aminoketone which has still not reacted and, as soon as the aminoketone test shows that there are only traces present, the product is distilled directly from the reaction flask. In this manner, there are obtained 340 g. of crude base, which is already fairly pure. Boiling point of the diamine: 149–152° C./10 mm.

The product can further be purified as the free base, most of all by distillation.

The undecamethylene diamine is a white, waxy mass with a slight odour of amine. It has a very high affinity for water and carbon dioxide.

*Analysis.*—(1) The dihydrochloride, which is not hygroscopic and which can easily be recrystallized from absolute ethanol: Equivalent weight based on the chloride content.—Theoretical: 129.45. Found: 129.2.

(2) The benzoyl derivatives, recrystallized from methanol or ethanol, has a melting point of 122° C.

I claim:

1. A process for producing aliphatic diamines, comprising heating a Schiff's base of the formula

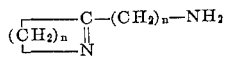

wherein $n$ is an integer of 3–7, with a reactive amount of a hydrogenating reagent selected from the group consisting of hydrazine and semi-carbazide and a catalytic amount of a strong base selected from the group consisting of alkali metal hydroxide, alkaline earth metal hydroxide, alkali metal oxide, alkaline earth metal oxide, alkali metal alcoholate and alkaline earth metal alcoholate, maintaining a temperature of about 100°–350° C. until the evolution of nitrogen ceases, and recovering the resultant diamine product.

2. A process of claim 1 wherein the Schiff's base is a member selected from the group consisting of 1,7-diaminoheptan-4-one, 1,11-diaminoundecan-6-one and 1,13-diaminotridecan-7-one, and the strong base is a member selected from the group consisting of alkali metal hydroxides, alkaline earth metal hydroxides, alkali metal oxides, alkaline earth metal oxide, alkali metal alcoholates and alkaline earth metal alcoholates.

3. A process of claim 1 wherein the Schiff's base is a member selected from the group consisting of 1,7-diaminoheptan-4-one and 1,11-diaminoundecan-6-one, the reaction being effected at a temperature of about 100–300° C. in the presence of a catalytic amount of a member selected from the group consisting of alkali metal hydroxides, alkaline earth metal hydroxides, alkali metal oxides, alkaline earth metal oxides, alkali metal alcoholates and alkaline earth metal alcoholates, and recovering the resulting product.

4. A process of claim 2 wherein the ratio of Schiff's base to hydrazine is about 1:1–2 mol and the reaction is effected at a temperature of about 150° C.–250° C.

5. A process of claim 2 wherein the hydrogenating reagent is utilized as an 80%–24% aqueous solution.

6. A process of claim 2 wherein the reaction is effected under superatmospheric pressure and the resulting product is recovered by vacuum distillation.

7. A process which comprises heating together to a temperature of between 150 to 250° C. a Schiff's base of the formula

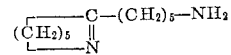

with an aqueous hydrazine solution and potassium hydroxide until the evolution of nitrogen ceases, and recovering the resultant undecamethylene diamine by distillation.

No references cited.

CHARLES B. PARKER, *Primary Examiner.*

RICHARD L. RAYMOND, *Assistant Examiner.*